United States Patent
Matthews et al.

(10) Patent No.: US 6,473,840 B2
(45) Date of Patent: *Oct. 29, 2002

(54) DATA PROCESSING SYSTEM HAVING A NETWORK AND METHOD FOR MANAGING MEMORY BY STORING DISCARDABLE PAGES IN A LOCAL PAGING DEVICE

(75) Inventors: Gareth Christopher Matthews, Cedar Park; David Medina, Austin; Allen Chester Wynn, Round Rock, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,460

(22) Filed: Jun. 19, 1998

(65) Prior Publication Data

US 2001/0011335 A1 Aug. 2, 2001

(51) Int. Cl.$^7$ ............................................. G06F 13/00
(52) U.S. Cl. ..................... 711/154; 711/209; 711/118; 709/203
(58) Field of Search ................. 711/203, 206, 711/208, 209, 100, 113, 118, 133, 159; 709/203

(56) References Cited

U.S. PATENT DOCUMENTS

| | | | | |
|---|---|---|---|---|
| 5,388,242 A | * | 2/1995 | Jewett | 711/113 |
| 5,452,447 A | | 9/1995 | Nelson et al. | 707/205 |
| 5,544,349 A | * | 8/1996 | Berry et al. | 711/117 |
| 5,596,726 A | | 1/1997 | Thielen | 709/234 |
| 5,606,685 A | * | 2/1997 | Frandeen | 711/117 |
| 5,628,005 A | | 5/1997 | Hurvig | 707/8 |
| 5,809,551 A | * | 9/1998 | Blandy | 711/117 |
| 5,860,116 A | * | 1/1999 | Washington | 711/148 |

FOREIGN PATENT DOCUMENTS

JP          07152710          11/1993

* cited by examiner

Primary Examiner—Glenn Gossage
(74) Attorney, Agent, or Firm—Duke W. Yee; Jeffrey S. LaBaw; Michael R. Nichols (57) ABSTRACT

A method in a data processing system for managing memory within the data processing system. A discardable page that is to be removed from the memory is identified. A determination is made as to whether performance will increase by storing the discardable page in a paging device located within the data processing system. If it is determined that performance will increase, the discardable page is marked as a paged discardable page and stored in the paging device locally, wherein this page may be retrieved from the paging device. The paging device may take the form of a paging file, such as a swap file. If space is unavailable within the paging device, the discardable page may be discarded. These processes may be implemented in a network computer.

25 Claims, 4 Drawing Sheets

DATA PROCESSING SYSTEM HAVING A NETWORK AND METHOD FOR MANAGING MEMORY BY STORING DISCARDABLE PAGES IN A LOCAL PAGING DEVICE

BACKGROUND OF THE INVENTION

1. Technical Field

The present invention relates to an improved distributed data processing system and in particular to an improved method and apparatus for managing memory within a data processing system. Still more particularly, the present invention relates to a method and apparatus for managing pages in a data processing system.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software includes the operating system, the program which controls the actual computer or central processing unit (CPU), and device drivers which control the input and output devices (I/O) such as printers and terminals.

A general purpose computer is fairly complicated. Usually a queue of application programs is present waiting to use the CPU. The operating system will need to determine which program will run next, how much of the CPU time it will be allowed to use and what other computer resources the application will be allowed to use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which may be called a computer network. Today, many computer work stations are connected to other work stations, file servers, or other resources over a local area network (LAN). Each computer on a network is connected to the network via an adapter card or other similar means, which provides an ability to establish a communications link to the network.

Typically, in a network, applications are stored on a server and accessed by network computers (NCs), also referred to as "clients". A network computer will retrieve pages from a server. Depending on the configuration of the network computer, memory constraints may occur while running applications from the server. In a network computing environment in which all of the network computer's applications are downloaded across the network, a run time problem is present due to constraints, which include, network traffic, application/image size, amount of memory on then network computer, and server load. In a memory constrained environment, the network computer's operating system will remove (swap or discard) pages from memory to make room for new pages. If a page which was discarded from the memory in the network computer is needed at a later time, it must be retrieved from the server across the network. Retrieving pages from the server will take longer than retrieving pages located locally on the network computer and retrieving pages located locally on the network computer, rather than from the server also reduces the network load.

Therefore, it would be advantageous to have an improved method and apparatus for managing pages in a network computer.

SUMMARY OF THE INVENTION

The present invention is directed to a method in a data processing system for managing data within the data processing system. A discardable page that is to be removed from the memory is identified. A determination is made as to whether performance will increase by storing the discardable page in a paging device located within the data processing system. If it is determined that performance will increase, the discardable page is marked as a paged discardable page and stored in the paging device locally, wherein this page may be retrieved from the paging device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
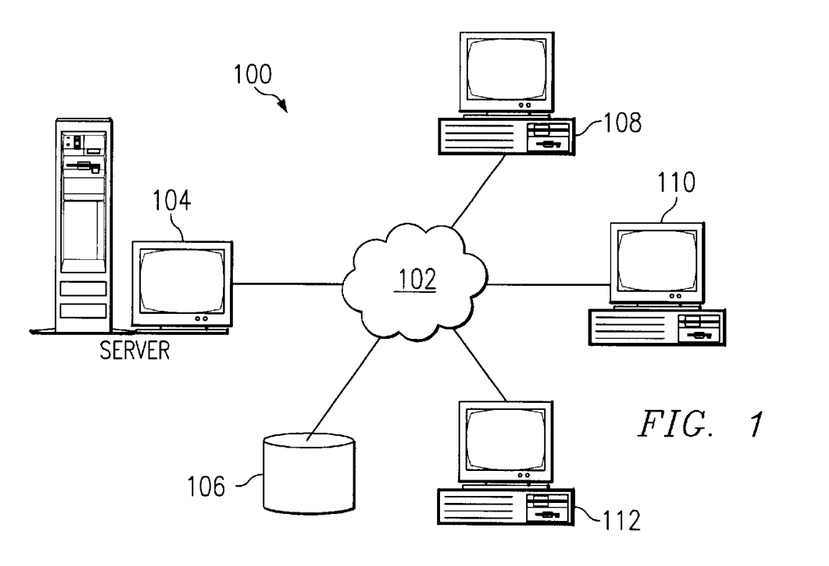
FIG. 1 is a diagram of a distributed data processing system in accordance with a preferred embodiment of the present invention.

With reference now to the figures, and in particular with reference to FIG. 1, a diagram of a distributed data processing system is depicted in accordance with a preferred embodiment of the present invention. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, network computers (NCs) 108, 110, and 112 also are connected to network 102. For purposes of this application, a network computer is any computer, coupled to a network, which receives a boot image from another computer coupled to the network and also may be a server managed computer. Server 104 provides data, such as boot files, operating system images, and applications to NCs 108–112. NCs 108, 110, and 112 are clients to server 104. Distributed data processing system 100 may include additional servers, NCs, and other devices not shown. FIG. 1 is intended as an example, and not as an architectural limitation for the processes of the present invention.

Figure 2:
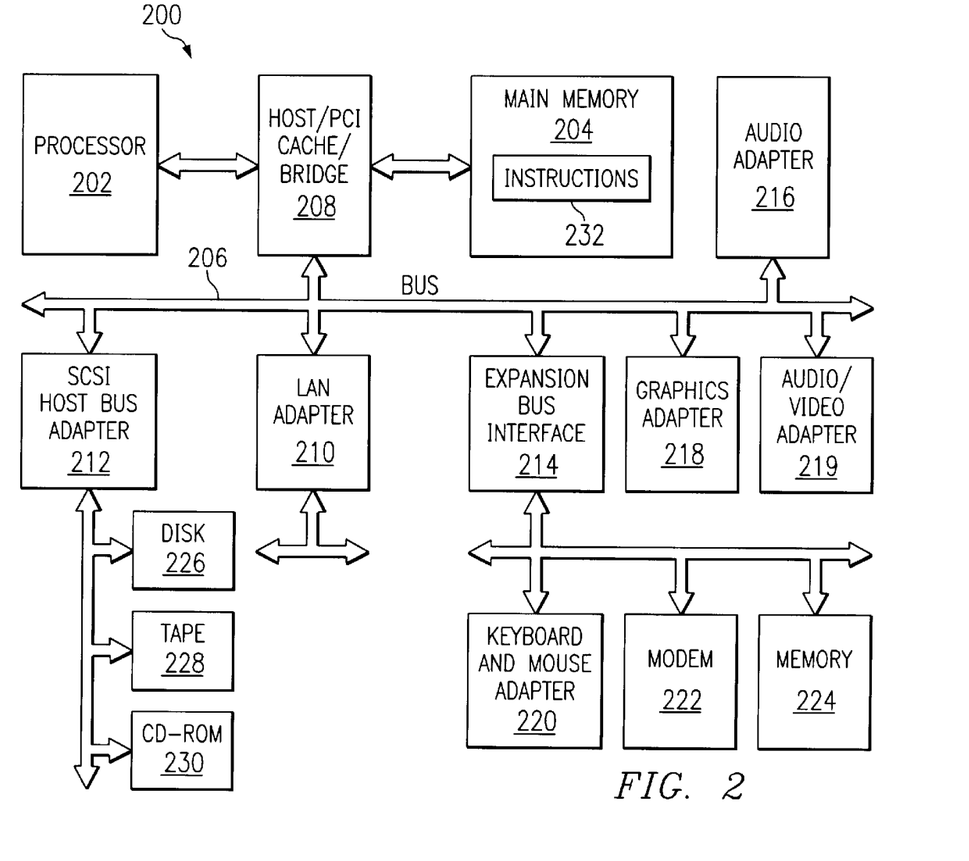
FIG. 2 is a block diagram of a data processing system in which the present invention may be implemented.

Turning next to FIG. 2, a block diagram of a data processing system 200 in which the present invention may be implemented is illustrated. Data processing system 200 may be used either as a server or a network computer. Data processing system 200 employs a peripheral component interconnect (PCI) local bus architecture. Although the depicted example employs a PCI bus, other bus architectures such as Micro Channel and Industry Standard Architectures (ISA) may be used. Processor 202 and main memory 204 are connected to PCI local bus 206 through PCI bridge 208. Micro Channel is a trademark of International Business Machines (IBM) Corporation. PCI bridge 208 also may include an integrated memory controller and cache memory for processor 202. Additional connections to PCI local bus 206 may be made through direct component interconnection or through add-in boards. In the depicted example, local area network (LAN) adapter 210, Small Computer System Interface (SCSI) host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and compact disc read only memory (CD-ROM) 230 in the depicted example. Typical PCI local bus implementations will support three or four PCI expansion slots or add-in connectors. Data processing system 200 also contains instructions 232 within main memory 234, which may be executed by processor 202 to perform various functions.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. Implemented as a network computer (NC), data processing system 200 may include fewer components than illustrated in FIG. 2. For example, many network computers (NC'S) may be diskless or have only a single storage device, such as hard disk drive 226. Data processing system 200 also may be implemented as a server. The depicted example is not meant to imply architectural limitations with respect to the present invention.

In the depicted examples, a pageable page is a page that can be stored in a paging space, such as a swap file. A discardable page is a page that normally will not be stored in a paging space. A paged-discardable page is a discardable page that is stored within paging device. This type of page also is referred to as a transiently paged page.

The present invention provides a method and system for managing pages in a network computer by treating discardable pages as transiently pageable pages or swap-as-space-permits pages. If a network computer determines that a discardable page should be removed from memory, and a paging device is located locally in the network computer, one or more metrics is used to determine whether the page should be stored locally. These metrics may include, for example, without limitation, network load, frequency of access, or if a paging device located locally within the network computer has sufficient room to store this discardable page. If the discardable page is to be stored, it is marked as paged discardable or transiently pageable and stored within the local paging device. If the page is later needed, it can be retrieved from the local paging device without having to access the server to retrieve the page from across the network. The processes used to identify, store, and retrieve pages are described in more detail below.

Figure 3:
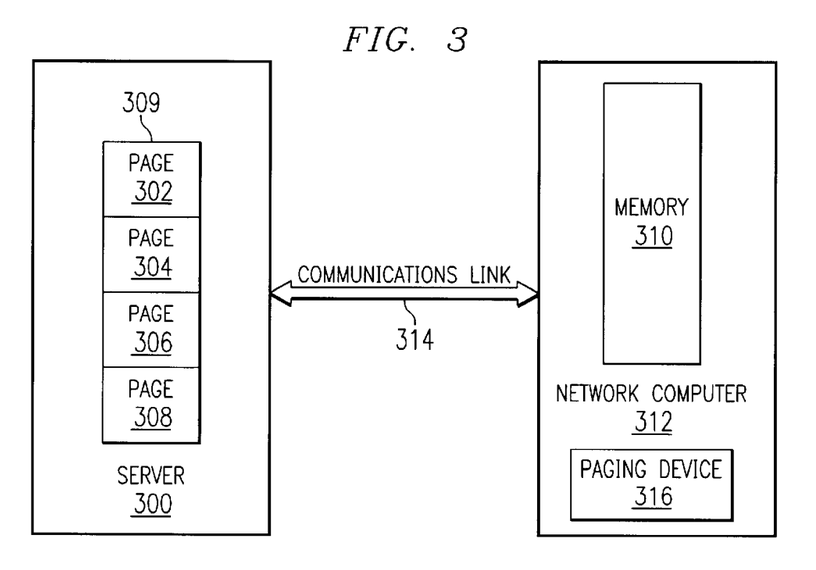
FIG. 3 is a block diagram of components used in managing a network computer in accordance with a preferred embodiment of the present invention.

Turning next to FIG. 3, a block diagram of components used in managing a network computer is depicted in accordance with a preferred embodiment of the present invention. In the depicted example in FIG. 3, network computer 312 downloads pages 302–308 to memory 310 in network computer 312 from server 300 using communications link 314. In the depicted example, a page is a fixed-size block of memory. When used in the context of a paging memory system, a page is a block of memory whose physical address can be changed via mapping hardware. These pages may include execution code and data for an application used on network computer 312. Typically, code pages sent from server 300 to memory 310 in network computer 312 are considered discardable when a free page is needed and is unavailable in memory 310. In such a case, the page is removed from memory 310. At a later time, if the page is accessed and absent from the memory, a page fault occurs, and the page is reloaded from server 300.

According to the present invention, network computer 312 marks a page from server 300 as being paged discardable or transiently pageable. All pages from server 300 may be marked as paged discardable or selected pages may be marked. In addition, pages originating from files on network computer 312 may be handled in a similar manner. When a free page is needed and not available within network computer 312, a page replacement candidate is selected from the pages in memory 310. If the page is one that has been marked as discardable, a check is made as to whether paging device 316 within network computer 312 has space to store the discardable page. If space is present within paging device 316, the discardable page is marked paged-discardable and stored within paging device 316. The next time this page is needed, the page is retrieved from paging device 316 in network computer 312 instead of having to retrieve the page from server 300. In this manner, having transiently pageable pages stored locally on a storage device within network computer 312 reduces the need to access server 300.

Figure 4:
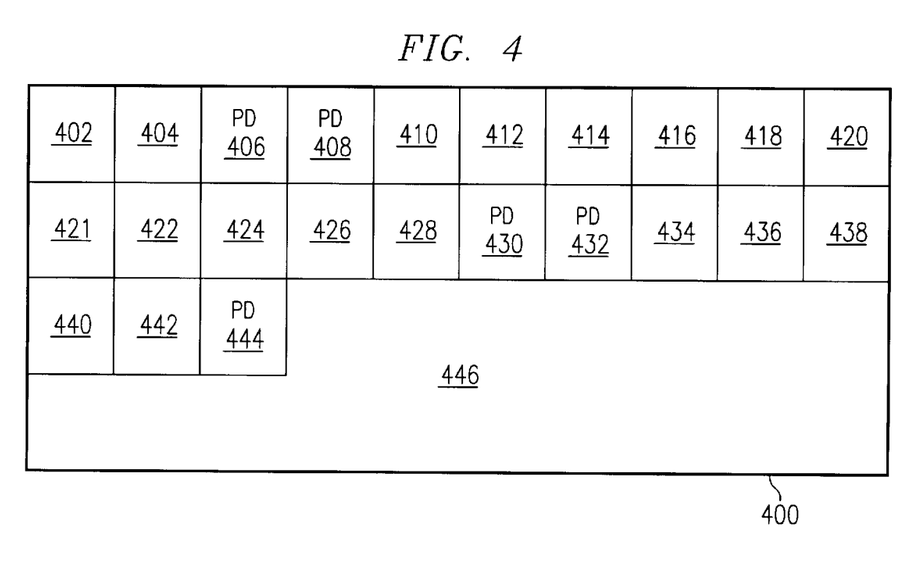
FIG. 4 is a diagram of a paging device in accordance with a preferred embodiment of the present invention.

Turning next to FIG. 4, a diagram of a paging device is depicted in accordance with a preferred embodiment of the present invention. Paging device 400 contains pages 402–444. Pages 406, 408, 430, 432, and 444 have been marked as paged-discardable (PD), also referred to as "transiently pageable". Section 446 of paging device 400 contains free space for storing additional pages. The paged-discardable pages may be removed from paging device 400 in case space is needed within paging device 400. In the depicted example, aging device 400 is a paging file. Any type of storage device may be employed as a storage device as long as the storage device provides a quicker transfer of data than the network.

Figure 5:
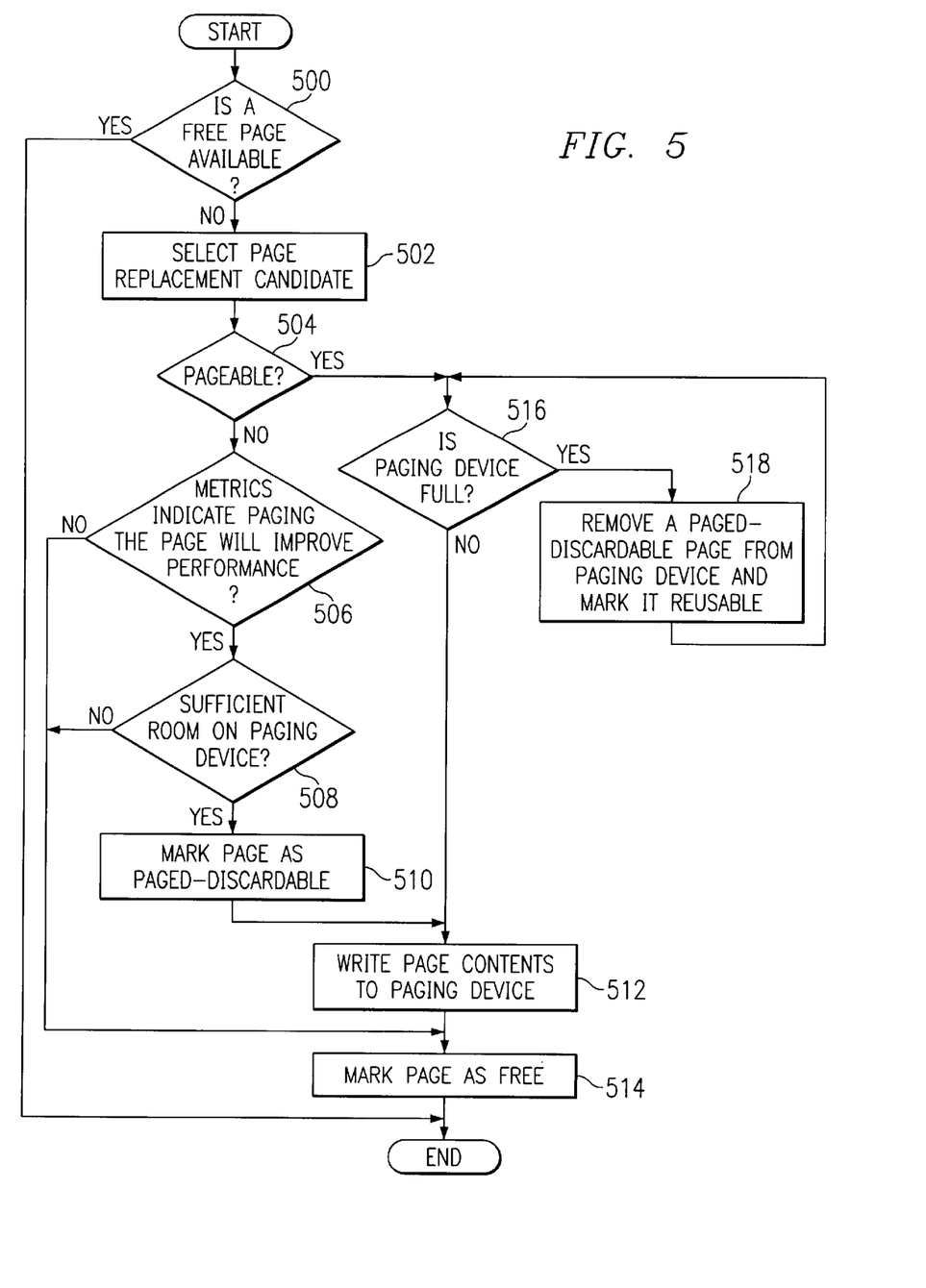
FIG. 5 is a flowchart of a process for obtaining a free page in accordance with a preferred embodiment of the present invention.

Turning next to FIG. 5, a flowchart of a process for obtaining a free page is illustrated in accordance with a preferred embodiment of the present invention. The process is initiated by a need for a page in memory. A determination is made as to whether a free page is available (step 500). If a free page is available, the process terminates. In this instance, the free page is used to store data, instructions, or a combination of the two. If a free page is unavailable, a page replacement candidate is selected (step 502). A determination is made as to whether the selected page replacement candidate is pageable (step 504). A page replacement candidate is pageable depending on the source of the page. For example, if an application allocates a page, the page would always be pageable.

If the page replacement candidate is not pageable, a determination is made as to whether metrics indicate that paging the page will improve performance (step 506). One metric that may be used is whether the page replacement candidate is from a server. Paging a page from a server to a paging file located within the network computer will increase performance because the server will not have to be accessed by the network computer. This increases performance in both the network and the network computer. The performance of the network is increased because less traffic occurs on the network when paging to a local paging device. In addition, performance within the network computer may be enhanced because the time needed to access the paged information is decreased by many cases when the information is paged to a local paging device. Other metrics may include, for example, without limitation, network load, frequency of access, or if a paging device located locally within the network computer has sufficient room to store this discardable page.

If metrics indicate that paging the page will increase performance, a determination is made as to whether sufficient room is present on the paging device to store the page (Step 508). If the metrics are satisfied - - - room is available to store the page, the page is marked as paged-discardable (step 510). Thereafter, the page contents are written to the paging device (step 512), and the page is marked as free (step 514) with the process terminating thereafter.

With reference again to step 508, if sufficient room on the paging device to store the contents of the page is absent, the process proceeds to step 514 and the page is marked as free without the page contents being stored to the paging device. Turning again to step 506, if the metrics do not indicate that paging the page will improve performance, the process also proceeds to step 514.

Referring back to step 504, if the selected page replacement candidate is pageable, a determination as to whether the paging device is full is made (step 516). If the paging device is not full, the process proceeds to step 512 as described above. Otherwise, a paged discardable page is selected for removal from the paging device and the space in the paging device where the paged discardable page resides is marked as reusable or available (step 518) with the process then returning to step 516. A discardable page may be selected for removal from the paging device using different mechanisms. For example, pages may be removed on a first in first out (FIFO) basis. The loop in the process continues until space is available in the paging device. The depicted example employs a determination of whether space is available in the paging device in step 516. Other metrics as previously described may be used to determine whether to store the discardable page With reference to FIG. 6, a flowchart of a process for processing a page fault is depicted in accordance with a preferred embodiment of the present invention. When a page that is absent from the memory is accessed, a page fault is generated to have the absent page placed into memory. The process begins by getting or obtaining a free page (step 600).

Figure 6:
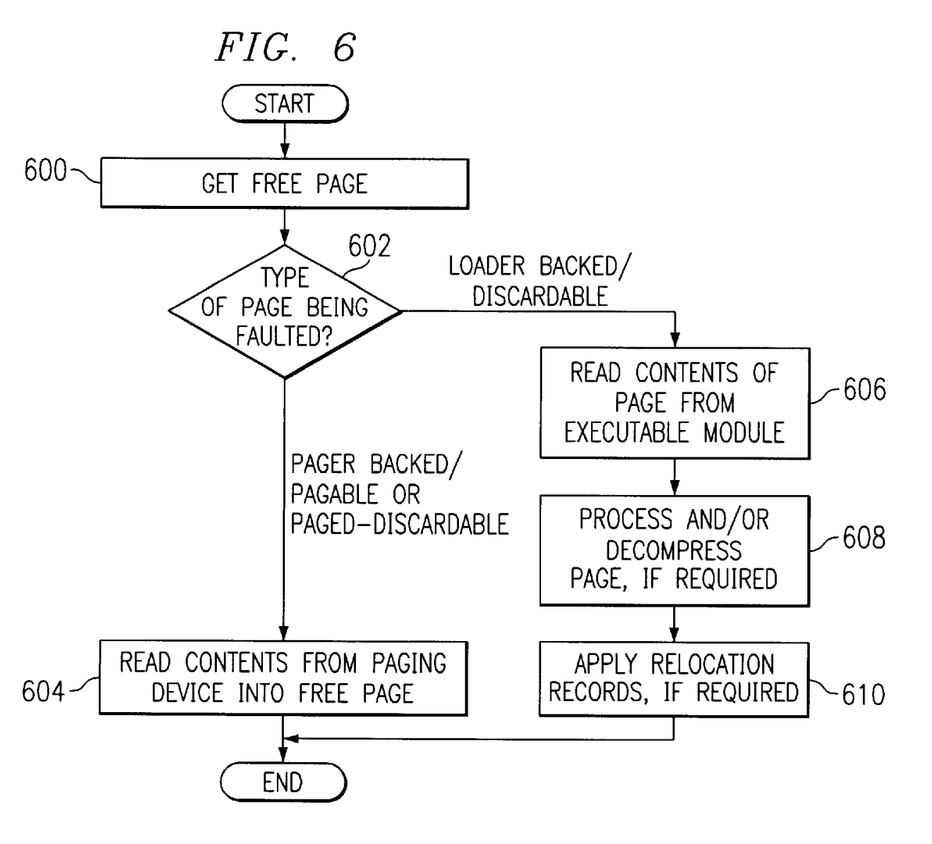
FIG. 6 is a flowchart of a process for processing a page fault in accordance with a preferred embodiment of the present invention.

The step of obtaining a free page was described in more detail in FIG. 5 above. A determination is made as to what type of page is being faulted (step 602). If the page is a pager backed/pageable or a page discardable page, the process then reads the contents from the paging device into the free page (step 604) with the process terminating thereafter. A pager backed/pageable or a page-discardable page is a page that is stored in the paging device.

On the other hand, if the page is a loader backed/discardable page, the process then reads the contents of the page from the executable module (step 606). Next, the contents for the page are processed and decompressed if necessary (step 608), and relocation records are applied, if necessary (step 610) with the process terminating thereafter.

Thus, the present invention provides an improved method and apparatus for managing pages in a data processing system. The present invention increases performance on the network as well as within a network computer. This advantage is provided by storing pages from the server on a paging device located locally within the network computer. By storing the pages within the paging device, the pages can be retrieved locally, rather than accessing the server, when the pages are again needed. By retrieving pages locally, the amount of traffic on the network is reduced and the time needed to retrieve pages is also reduced.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc or disk, a hard disk drive, a random access memory (RAM) and compact disc read only memories (CD-ROMs) and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing memory within a data processing system, the method comprising:
    identifying a discardable page that is to be removed from the memory;
    determining whether performance will increase by storing the discardable page in a paging device located within the data processing system;
    marking the discardable page as a page-d discardable page in response to the determination that performance will increase by storing the discardable page in the paging device located within the data processing system; and
    storing the discardable page in the paging device located within the data processing system, wherein the discardable page may be retrieved from the paging device.

2. The method of claim 1 further comprising:
    determining whether space is available within the paging device to store the discardable page; and discarding the page instead of storing the page in response to identifying space is unavailable within the paging device to store the discardable page.

3. The method of claim 1, wherein the paging device is a paging file.

4. The method of claim 3, wherein the paging file is located on a hard disk drive within the data processing system.

5. A method in a data processing system for managing memory within the data processing system, the method comprising:

identifying a discardable page from a server that is to be discarded from the memory;

storing the discardable page in a paging device located within the data processing system, wherein the discardable page may be retrieved from the paging device instead of from the server;

determining whether space is available within the paging device to store the discardable page; and discarding the discardable page instead of storing the discardable page in response to a determination that space is unavailable within the paging device to store the discardable page.

6. A method in a data processing system for managing memory within the data processing system, the method comprising:

identifying a page from a server that is to be discarded from the memory;

storing the page in a paging device located within the data processing system, wherein the page may be retrieved from the paging device instead of from the server;

determining whether space is available in the paging device in response to a condition that a page is to be removed from the memory and stored within the paging device;

discarding a discardable page within the paging device in response to a determination that paging space is unavailable within the paging device; and storing the discardable page within the paging device in response to a determination that paging space is available within the paging device.

7. The method of claim 6, wherein a plurality of discardable pages are stored within the paging device and wherein a page from the plurality of discardable pages is discarded on a first in first out basis.

8. A method in a network computer for managing pages from a server, the method comprising:

receiving a discardable page from the server in a memory within the network computer;

determining whether space is available in a paging file located within the network computer in response to a determination that the discardable page is to be removed from the memory; and storing the discardable page within the paging file.

9. The method of claim 8, wherein the discardable page is stored with an indication that the discardable page is removable.

10. A method for managing memory within a network computer in which client images are stored at a server, the method comprising:

designating pages from the server as discardable pages;

determining that a first discardable page from the discardable pages designated should removed from the memory;

determining whether sufficient space is present to store the first discardable page in a paging file on local storage for the network computer; and storing the first discardable page within the paging file.

11. A network comprising:

a server, wherein the server stores a plurality of pages; and a network computer, wherein the network computer is connected to the server and includes:

memory, wherein pages from the plurality of pages are downloaded from the server into the memory;

a storage device;

a paging file located on the storage device;

a processor, wherein the processor performs acts including:

identifying a page from the pages downloaded from the server that is to be discarded from the memory;

determining whether space is available within the paging file to store the page; and in response to a determination that space is available, storing the page.

12. The network of claim 11, wherein in response to a determination that space is unavailable, the processor discards the page that is to be discarded from memory instead of storing that page.

13. The network of claim 11, wherein the page is a first page and the processor, in response to a condition that a page is to be discarded from the memory, determines whether space is available within the paging file; the processor, in response to a determination that space is unavailable within the paging file, discards a discardable page within the paging file; and the processor, in response to a determination that paging space is available within the paging file, stores the first page within the paging file.

14. A data processing system for managing memory located within the data processing system, the data processing system comprising:

identification means for identifying a discardable page that is to be removed from the memory;

determination means for determining whether performance will increase by storing the discardable page in a paging device located within the data processing system;

marking means for marking the discardable page as a page-d discardable page; and storage means for storing the discardable page in the paging device located within the data processing system, wherein the discardable page may be retrieved from the paging device.

15. The data processing system of claim 14, wherein the paging device is a paging file.

16. The data processing system of claim 15, wherein the paging file is located on a hard disk drive located within the data processing system.

17. A data processing system for managing memory within the data processing system, the data processing system comprising:

identifying means for identifying a page from a server that is to be discarded from the memory; and storing means for storing the page in a paging device located within the data processing system, wherein the page may be retrieved from the paging device instead of from the server.

18. The data processing system of claim 17, wherein the identifying means is a first identifying means and wherein the page is a discardable page and further comprising:

second identifying means for identifying whether space is available within the paging device to store the discardable page; and discarding means, responsive to determining that space is unavailable within the paging device to store the discardable page, for discarding the page instead of storing the page.

19. The data processing system of claim 17, wherein the page is marked as a transiently swappable page when stored within the paging device.

20. The data processing system of claim 17 further comprising:

determination means, responsive to a condition that a page is to be removed from the memory and stored within the paging device, for determining whether space is available in the paging device;

discarding means, responsive to a determination that paging space is unavailable within the paging device, for discarding a discardable page within the paging device; and second storage means for storing the nondiscardable page within the paging device.

21. The data processing system of claim 20, wherein a plurality of discardable pages are stored within the paging device and wherein a page from the plurality of discardable pages is discarded on a first in first out basis.

22. The data processing system of claim 17, wherein the paging device is a paging file.

23. The data processing system of claim 22, wherein the paging file is a swap file.

24. A computer program product on a computer readable medium for managing memory in a data processing system, the computer program product comprising:

first instructions for identifying a discardable page that is to be removed from the memory;

second instructions for determining whether performance will increase by storing the discardable page in a paging device;

third instructions for marking the discardable page as a page-d discardable page; and fourth instructions for storing the discardable page in a paging device located within the data processing system, wherein the discardable page may be retrieved from the paging device, wherein the instructions are embodied on the computer readable medium.

25. The computer program product of claim 24 further comprising:

fifth instructions for identifying whether space is available within the paging device to store the discardable page; and sixth instructions, responsive to determining that space is unavailable within the paging device to store the discardable page, for discarding the page instead of storing the page.

* * * * *

UNITED STATES PATENT AND TRADEMARK OFFICE
CERTIFICATE OF CORRECTION

PATENT NO.   : 6,473,840 B2
DATED        : October 29, 2002
INVENTOR(S)  : Matthews et al.

It is certified that error appears in the above-identified patent and that said Letters Patent is hereby corrected as shown below:

Column 6,
Line 57, after "as a", please delete "page-d" and insert -- paged --.

Column 8,
Line 40, before "discardable", please delete "page-d" and insert -- paged --.

Column 10,
Line 10, before "discardable", please delete "page-d" and insert -- paged --.

Signed and Sealed this

Twenty-seventh Day of May, 2003

JAMES E. ROGAN
*Director of the United States Patent and Trademark Office*